(12) United States Patent
Gruhl et al.

(10) Patent No.: US 11,438,454 B2
(45) Date of Patent: Sep. 6, 2022

(54) AUTHENTICATION AND AUTHORIZATION VIA VOCAL TRACK FREQUENCY CHANNEL

(71) Applicant: International Business Machines Corporation, Armonk, NY (US)

(72) Inventors: Daniel Gruhl, San Jose, CA (US); Alfredo Alba, Morgan Hill, CA (US); Linda Ha Kato, San Jose, CA (US); Chad Eric DeLuca, Morgan Hill, CA (US); Anna Lisa Gentile, San Jose, CA (US); Petar Ristoski, San Jose, CA (US); Steven R. Welch, Gilroy, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 16/835,718

(22) Filed: Mar. 31, 2020

(65) Prior Publication Data

US 2021/0306454 A1   Sep. 30, 2021

(51) Int. Cl.
 *H04M 3/42*  (2006.01)
 *G10L 15/22*  (2006.01)
 *H04L 9/08*  (2006.01)

(52) U.S. Cl.
 CPC ......... *H04M 3/42076* (2013.01); *G10L 15/22* (2013.01); *H04L 9/0825* (2013.01); *H04M 3/42042* (2013.01); *G10L 2015/227* (2013.01)

(58) Field of Classification Search
 CPC .......... H04M 3/42076; H04M 3/42042; G10L 15/22; G10L 2015/227; H04L 9/0825; H04W 12/06

USPC .......................................................... 455/415
See application file for complete search history.

(56) References Cited

U.S. PATENT DOCUMENTS

| | | | |
|---|---|---|---|
| 6,324,271 B1 | 11/2001 | Sawyer et al. | |
| 7,006,605 B1 | 2/2006 | Morganstein et al. | |
| 8,116,436 B2 | 2/2012 | Isenberg | |
| 9,525,668 B2* | 12/2016 | Bhargav-Spantzel | H04L 9/3234 |
| 9,544,770 B2 | 1/2017 | Har et al. | |
| 10,149,156 B1 | 12/2018 | Tiku et al. | |
| 10,194,390 B2* | 1/2019 | Guzik | H04W 4/06 |

(Continued)

FOREIGN PATENT DOCUMENTS

| | | | | |
|---|---|---|---|---|
| CN | 100414472 C | * | 8/2008 | G06F 21/32 |
| CN | 201610018888 | * | 1/2016 | H04L 9/065 |

(Continued)

OTHER PUBLICATIONS

Francesco et al., "Providing true end-to-end security in converged voice over IP infrastructures", ScienceDirect, 17 pages (Year: 2009).*

(Continued)

*Primary Examiner* — Mung-Thuy T Tran
(74) *Attorney, Agent, or Firm* — Peter Edwards, Esq.; McGinn I.P. Law Group, PLLC.

(57) ABSTRACT

A verification and authorization method, system, and computer program product include verifying, via a receiving device that receives a verification sound packet, an identity of a trusted caller via the verification sound packet, the verification sound packet including an asymmetrically encrypted payload sent by the trusted caller.

20 Claims, 4 Drawing Sheets

(56) References Cited

U.S. PATENT DOCUMENTS

| | | | | |
|---|---|---|---|---|
| 2002/0104025 | A1* | 8/2002 | Wrench, Jr. | H04L 9/3271 726/3 |
| 2003/0078838 | A1* | 4/2003 | Szmanda | G06Q 30/0273 705/14.52 |
| 2003/0135740 | A1* | 7/2003 | Talmor | H04L 9/3231 713/186 |
| 2005/0132060 | A1* | 6/2005 | Mo | H04L 51/12 709/227 |
| 2007/0204042 | A1* | 8/2007 | Noble | G06F 21/42 709/225 |
| 2011/0311094 | A1* | 12/2011 | Herzog | H04L 63/0428 382/100 |
| 2013/0322651 | A1* | 12/2013 | Cheever | H03G 5/00 381/101 |
| 2014/0039901 | A1* | 2/2014 | Mosko | H04M 11/066 704/500 |
| 2014/0040628 | A1* | 2/2014 | Fort | H04L 63/0869 713/182 |
| 2015/0237201 | A1 | 8/2015 | Feltham et al. | |
| 2016/0050187 | A1* | 2/2016 | Altberg | H04L 63/0428 380/255 |
| 2017/0078718 | A1* | 3/2017 | Ioffe | H04N 21/8355 |
| 2018/0007558 | A1* | 1/2018 | Maragoudakis | H04L 63/0853 |
| 2018/0176987 | A1 | 6/2018 | Oda et al. | |
| 2018/0294959 | A1* | 10/2018 | Traynor | H04W 12/06 |
| 2019/0164156 | A1* | 5/2019 | Lindemann | G06Q 20/40145 |
| 2020/0106877 | A1* | 4/2020 | Ledvina | H04W 8/183 |
| 2020/0175590 | A1* | 6/2020 | Huo | H04L 9/0816 |
| 2020/0193986 | A1* | 6/2020 | Joh | G10L 15/30 |
| 2020/0195778 | A1* | 6/2020 | Tang | H04M 3/4365 |
| 2020/0259845 | A1* | 8/2020 | Shaffer | H04L 63/1441 |
| 2020/0412547 | A1* | 12/2020 | Rusek | H04L 63/123 |
| 2021/0014674 | A1* | 1/2021 | Tsai | H04W 12/37 |
| 2021/0099303 | A1* | 4/2021 | Wang | G10L 25/18 |

FOREIGN PATENT DOCUMENTS

| | | | |
|---|---|---|---|
| WO | WO 2017/214380 A1 | 12/2017 | |
| WO | WO-2020005753 A1 * | 1/2020 | H04L 61/1511 |
| WO | WO-2020242700 A1 * | 12/2020 | G06F 21/44 |

OTHER PUBLICATIONS

Mel, et al. "The NIST Definition of Cloud Computing". Recommendati

Fan, M. Q., Wang, H. X., & Li, H. J. (2014). A fingerprint-based audio authentication scheme using frequency domain statistical characteristic. Multimedia tools and applications, 70(3), 2255-2270. See the highlighted sections.

Lee, M. K., Kim, J. B., & Song, J. E. (Jan. 2012). Smart phone user authentication using audio channels. In 2012 IEEE International Conference on Consumer Electronics (ICCE) (pp. 735-736). IEEE. See the highlighted sections.

* cited by examiner

AUTHENTICATION AND AUTHORIZATION VIA VOCAL TRACK FREQUENCY CHANNEL

BACKGROUND

The present invention relates generally to telecommunications and more particularly, but not by way of limitation, a system, method, and computer program product for verifying identity of trusted callers via a telecommunications network or devices connect over a network.

In order to identify a caller via existing telecommunications voice lines, technologies have been implemented such as caller identification (ID), cryptographically-certified caller authentication, etc.

Most of these technologies have been attacked via many different spoofing techniques, as well as caller ID mismatching. The reason for these attacks on the caller ID voice infrastructure is usually related to activities from misuse to "swatting" (e.g. criminal harassment tactic of deceiving an emergency service into sending an emergency response team to another person's address) all the way to fraudulent activities. Privacy concerns may arise from falsifying of a caller ID, when a receiver of a call provides private information based on his or her belief that a call originated from a trusted caller.

Caller ID technologies were developed out of necessity and on top of the following two fundamental underlying assumptions:
1. The telephone service providers do not manipulate caller IDs; and
2. The telephone infrastructure is tightly controlled, and no intruders could tap into the infrastructure to create an arbitrary caller ID These conditions were mainly true in the very early days of the dedicated telephone network, fundamentally operated by a monopoly. Today, none of these assumptions hold anymore because a plethora of telephone service carriers now exist, each of the telephone service carriers carries has its own trusted domain, and carriers cannot verify calls originated outside their trusted domains.

Moreover, inexpensive audio devices are at the fingertips of almost every person (e.g. cell phones). The audio devices are capable of sending packets as well as playing the packets via an audio emitter (e.g. speaker on a smart phone).

One conventional approach for caller identification suggests two computing devices play a musical phrase one octave apart (e.g. one computer plays the musical phrase in a first octave and second computer plays the musical phrase back in a second octave). This allows the human to identify that the two computers are talking while allowing the two computers to authenticate. This technique does not work, however, if the devices do not already have a network connection. This technique is also not amenable to non-real-time use, such as by leaving a musical phrase on a voicemail to play back at a later time when performing a task such as unlocking a safe.

Another conventional technique for caller identification uses an audio link in a network where there are potentially multiple audio receivers that can coordinate with each other. As such, the technique does not address any of the problems in the art such as compressed audio in a voicemail, degraded audio, etc. It also does not envision using this as an endpoint communication, rather it is only looking at audio as a network relay technology.

SUMMARY

Thereby, the inventors have identified a need in the art for a technique to send an asymmetrically encrypted payload with v-card, message, action, and receipt encoded information over a network to identify a caller and authorize an action via the encoded information. The inexpensive nature and supply over almost every person having a device capable of utilizing this technology allows for increased value.

In an exemplary embodiment, the present invention provides a computer-implemented verification and authorization method, the method including verifying an identity of a trusted caller via a verification sound packet including an asymmetrically encrypted payload.

In another exemplary embodiment, the present invention provides a computer program product, the computer program product comprising a non-transitory computer-readable storage medium having program instructions embodied therewith, the program instructions executable by a computer to cause the computer to perform: verifying an identity of a trusted caller via a verification sound packet including an asymmetrically encrypted payload.

In a third exemplary embodiment, the present invention provides a verification and authorization system, the system including a processor; and a memory, the memory storing instructions to cause the processor to perform: verifying an identity of a trusted caller via a verification sound packet including an asymmetrically encrypted payload.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
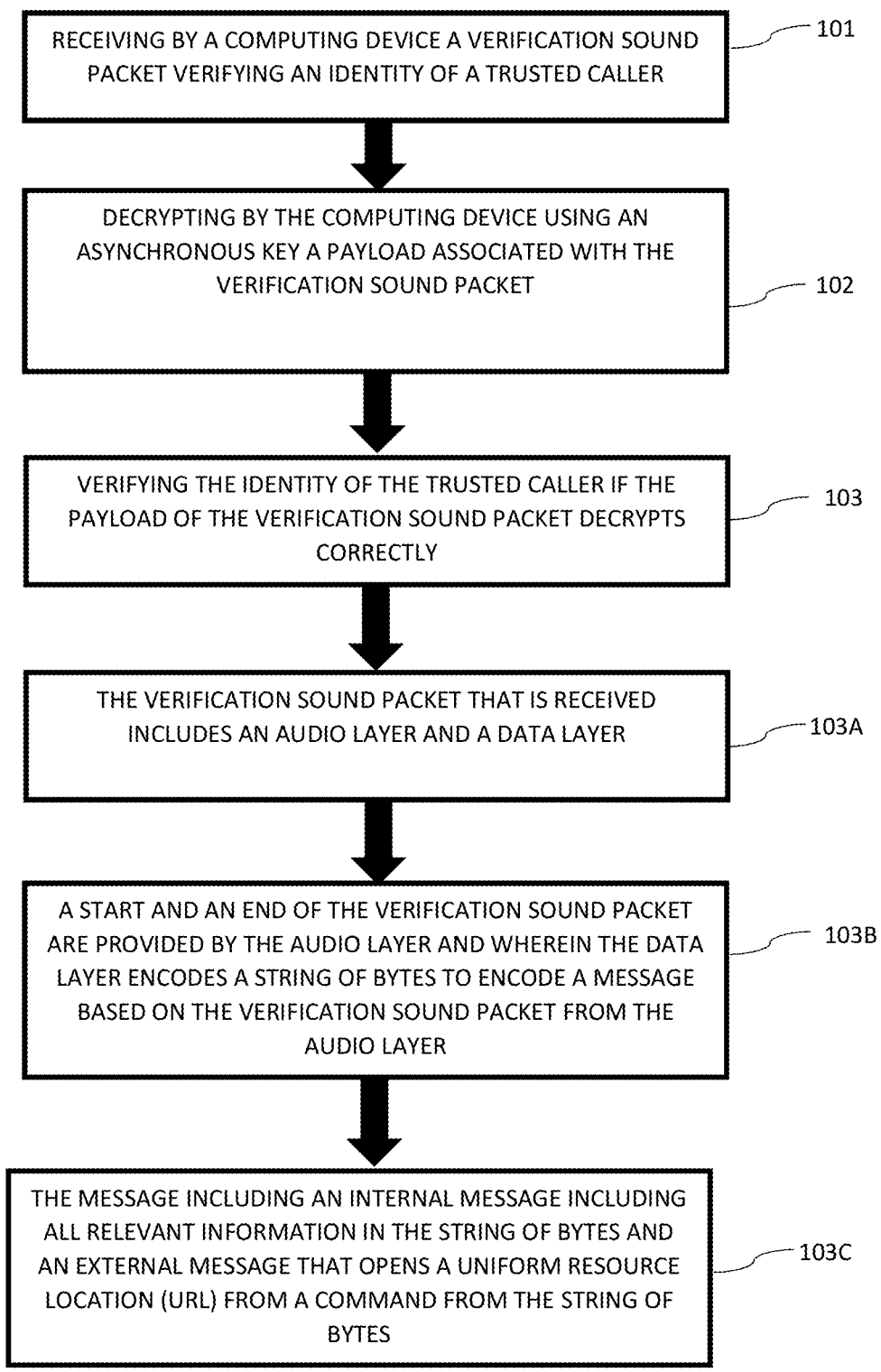
FIG. 1 exemplarily shows a high-level flow chart for a verification and authorization method 100 according to an embodiment of the present invention.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a verification and authorization method 100 according to the present invention can include various steps for providing a technique, for example, to verify an identity of trusted callers via a verification sound packet containing an asymmetrically encrypted payload with v-card (see e.g. https://en.wikipedia.org/wiki/VCard), a message such as a verbal, a written, or a recorded communication sent to or left for a recipient who cannot be contacted directly, action (i.e. a thing to be done (e.g. open a door, unlock safe, authorize access to bank account, etc.)), and a receipt (i.e. proof of something (e.g. proof of purchase)) encoded information, which can be transported over the existing voice infrastructure orthogonally (i.e. at the same time) to existing Caller ID data (such as further discussed below).

In other words, a data packet can be sent from a first user to a second user (e.g. over a voicemail, via a phone call, etc.). The data packet includes a pleasant sound (such as via a pentatonic scale as discussed later) to be played that includes encoded information therein to authorize an action on behalf of the first user for the second user by playing the sound clip over a device of the second user.

For example, in one embodiment, a first user can send a message to a second user that gives authority to the second user to enter a premise when the second user plays the recording (e.g. functioning similarly to a keycard/magnetic strip).

Or, the encoded message can be played via a second device of the second user to access a locked safe (such as if the safe has an access panel that authorizes access when the encoded message is played by the second device and the safe reads the encoded message for the 'key' to get into the safe). In another embodiment, the invention may allow for a voicemail to be recorded with the encoded file such that the second user may return the phone call and be automatically directed to the person that left the voicemail in a directory, by playing the encoded file. The sound is received and processed using conventional techniques (i.e. private-public key cryptography).

Indeed, the encoded file includes the encoded information for authorization of access and includes the feature of "sounding good" for a user (e.g. not sounding like a conventional dial-up internet tone). As discussed below, the encoded files include a data layer and an audio layer.

In other words, the invention allows for the playback of an audio file that includes the encoded information for authorization of access and the audio portion that can be heard by the users.

Figure 2:
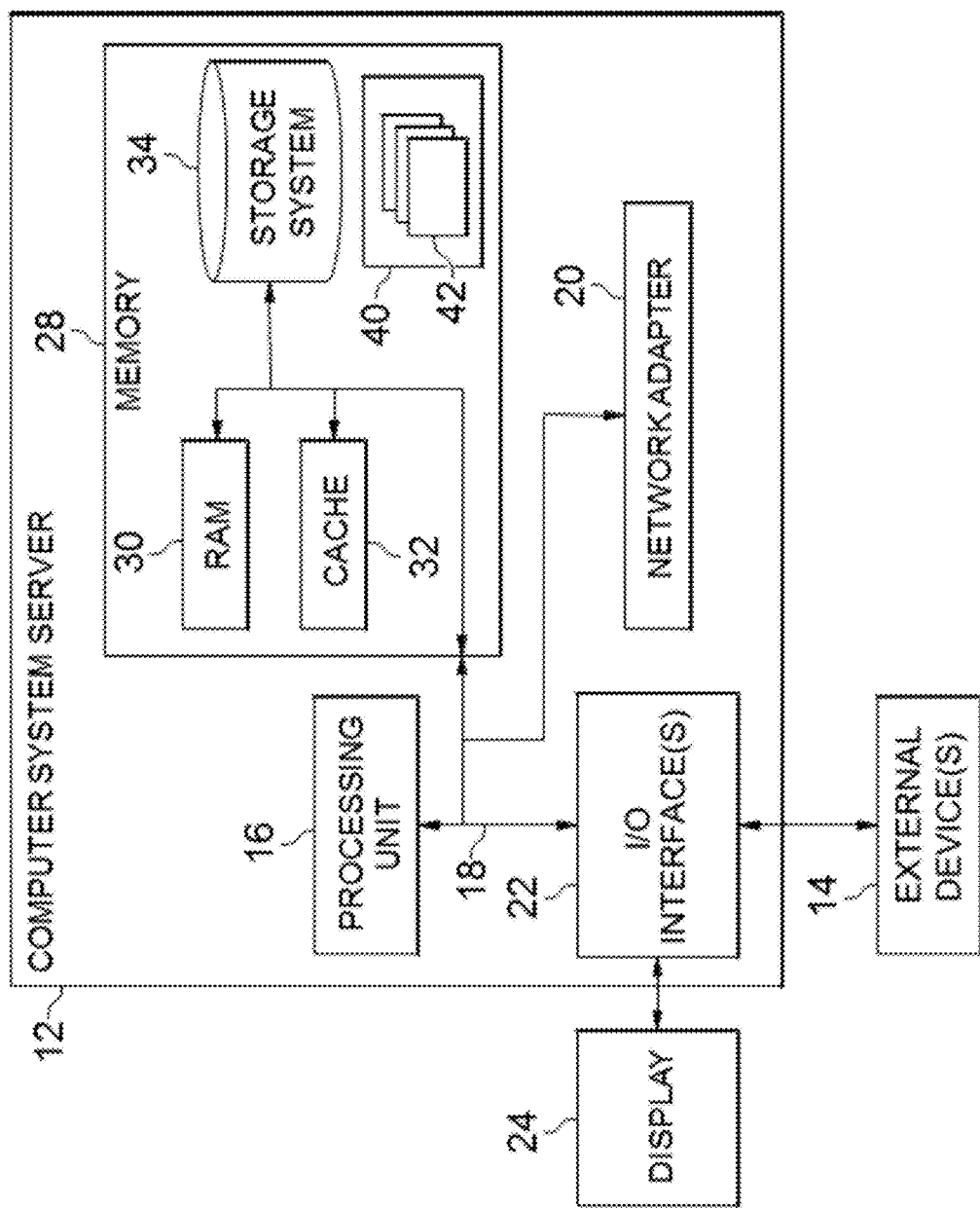
FIG. 2 depicts a cloud-computing node 10 according to an embodiment of the present invention.

By way of introduction of the example depicted in FIG. 2, one or more computers of a computer system 12 according to an embodiment of the present invention can include a memory 28 having instructions stored in a storage system to perform the steps of FIG. 1.

Although one or more embodiments may be implemented in a cloud environment 50 (e.g. FIG. 4), it is nonetheless understood that the present invention can be implemented outside of the cloud environment.

With reference to FIG. 1, in step 101, a verification sound packet is received, via a computing device, that verifies an identity of a trusted caller. That is, the trusted caller (i.e. first user) sends the verification sound packet from their device (e.g. smartphone, tablet, computer, etc.) to a second device of a second user. The second device of the second user receives the verification sound packet and authenticates the identity of the trusted caller based upon sound packet.

In various embodiments of the invention, the "sound packet" can be understood to have "two layers". The "two layers" include an audio layer that sends raw bits, and a data layer, which is the 'meaning', ascribed to those bits (e.g., such as in 103A). They can be understood to be separate and non-dependent upon each other. That is, the audio layer can be used to convey data for authentication and the data layer can use any underlying bit transport.

The audio layer take advantage of the fact that humans are sensitive to distortion of human voices. Thus, most human spaces have reasonable acoustic hearing in the human vocal range (~300-3000 Hz). Additionally, transport methods (e.g. telephones, voice mail recordings, etc.) generally transmit within these frequencies—although they may impart substantial distortion to aspects such as phase, due to distortion, compression, etc.

Also, humans tend to find any series of tones from a pentatonic scale to be non-objectionable as compared to conventional audio scales used for computer sound transmission (such as by a fax machine or a telephone modem for accessing dial up internet).

The invention takes these two considerations to derive a coding scheme for the audio layer by selecting a base frequency (e.g. 1 kHz) and using the five (5) pentatonic notes between the base frequency and its octave to encode the audio layer.

For example, signalling tones include 1000 Hz

| |
|---|
| 00 - 1125 Hz |
| 01 - 1250 Hz |
| 10 - 1500 Hz |
| 11 - 1666 Hz |

Thus, in any period of time, the invention is either signalling the start or the end of the sequence or is sending two bits of data (e.g., as in 103B). Signalling the start or the end is done by sending the attention frequency (such as by transmitting portions of a pentatonic scale not used for data). For testing, 128 samples from an 8 Hz sampling frequency worked well. Thus, each 'tone' is 16 milliseconds long. In an implementation, the invention can simply sample 8 millisecond segments to assure every other sample is aligned (although a proper locking system will improve results and reduce errors).

Indeed, the audio is processed to produce a bit stream. Typically, this processing would be done by a Digital Signal Processing layer, and may be done by a DFT, Wavelet transform, etc. or via matched filter system.

To generate the tones for the audio layer, tone generation uses an equation of: sample=A*sin(x); where for every sample, 'x' is advanced by an amount appropriate to the frequency the invention is seeking to generate. This assures a smooth transition between tones which is both more pleasing to the ear as well as less error-prone.

Simple tests of this scheme were performed using a test message played from a computer into a telephone headset dialed into a voice program. The subsequent message was downloaded as an .mp3 file and then decoded. Even with this highly suboptimal setup, bit accuracy above 85% was achieved.

Thus, coupled with an appropriate error-correcting coding system, the audio layer provides a sufficient data layer with a data rate of approximately 15 bytes per second. Thereby, the audio layer emits a so-called 'blip' that is pleasant to the human ear. The 'blip' may be, for example, a signature that is generated by a first transmitting device (e.g., such as a caller) and left on a voice mail (private key) of a receiving device (e.g., a receiver of the call from the caller) and can be decrypted by using a public key in well-known private-public key cryptography. Indeed, when the receiver of the call listens to the 'blip' on their receiving device via their voicemail, they hear a pleasant sound (i.e., the 'blip') which then is decrypted and conveys the information intended to be sent to the receiver of the call from the caller.

For the data layer, a start and an end of the packet are provided by the audio layer, thus the data layer receives a string of bytes. The invention uses the string of bytes for either an 'internal' or 'external' message. An internal message includes all of the relevant information (and is thus longer). An external message is a series of bytes which is appended to a known a uniform resource location (URL) which contains the message that is intended to be sent to the receiver of the call (e.g. a bank sending a message for a consumer and the message includes the URL that accesses the consumer's account).

Indeed, the data layer includes the meaning of the bytes from the audio layer such that an encoded message can be transmitted by playing the audio layer.

The external message is a series of bytes which is appended to a known URL such as: http://msg.blip.com/xxxxxxxxxx which contains a proper internal message. In other words, the second user can play the audio packet and listen to the audio layer. The data layer associated with the audio layer will then open a webpage on the device that plays the message (e.g., as in 103C).

An internal message ('m0') may be encrypted by the recipient's public key. Thus, decryption of the message (into 'm1') by the recipient's private key is proof of the intended recipient. 'm1' contains the sender's ID and a message encrypted by that sender's private key. Thus, decryption of the message (into m2) by the sender's public key is proof of sender. 'm2' contains a payload of the message sequence number to prevent replay attacks. Also, the data layer includes a timestamp so that messages should only be considered valid for a short time (depending on the use of the message). Typically, the message is a v-card, authorization, etc.

That is, in step 102, a payload associated with the verification sound packet is decrypted by the computing device using an asynchronous key. In other words, when the verification sound packet is played, the data layer is decrypted. And, in step 103, the identity of the trusted caller is verified if the payload of the verification sound packet decrypts correctly.

Therefore, a first user may send a verification sound packet that, when received on a computing device of a second user, plays an audio layer of the verification sound packet. The audio layer is "pleasant" to the human ear. The verification sound packet also includes a data layer that codes the meaning of the message and can be read by a device to allow some type of command to be performed. For example, an external message can be encrypted into the data layer such that a website opens, a door opens, a safe opens, a recorded message is played, a phone number is dialed which automates a phone tree, a gate is access (e.g. apartment complex), etc. For an internal message such as allowing access to a locked door, a safe, a banking account, etc., the data layer can be decrypted to allow the access.

Thus, the invention provides a new technique to allow verification of identity and authorization of some action via a verification sound packet.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g. country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g. storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g. web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g. host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g. mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g. network card, modem, etc.) that enable computer system/server 12 to communicate with one or more other computing circuits. For example, computer system/server 12 can communicate with one or more networks such as a local area network (LAN), a general wide area network (WAN), and/or a public network (e.g. the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
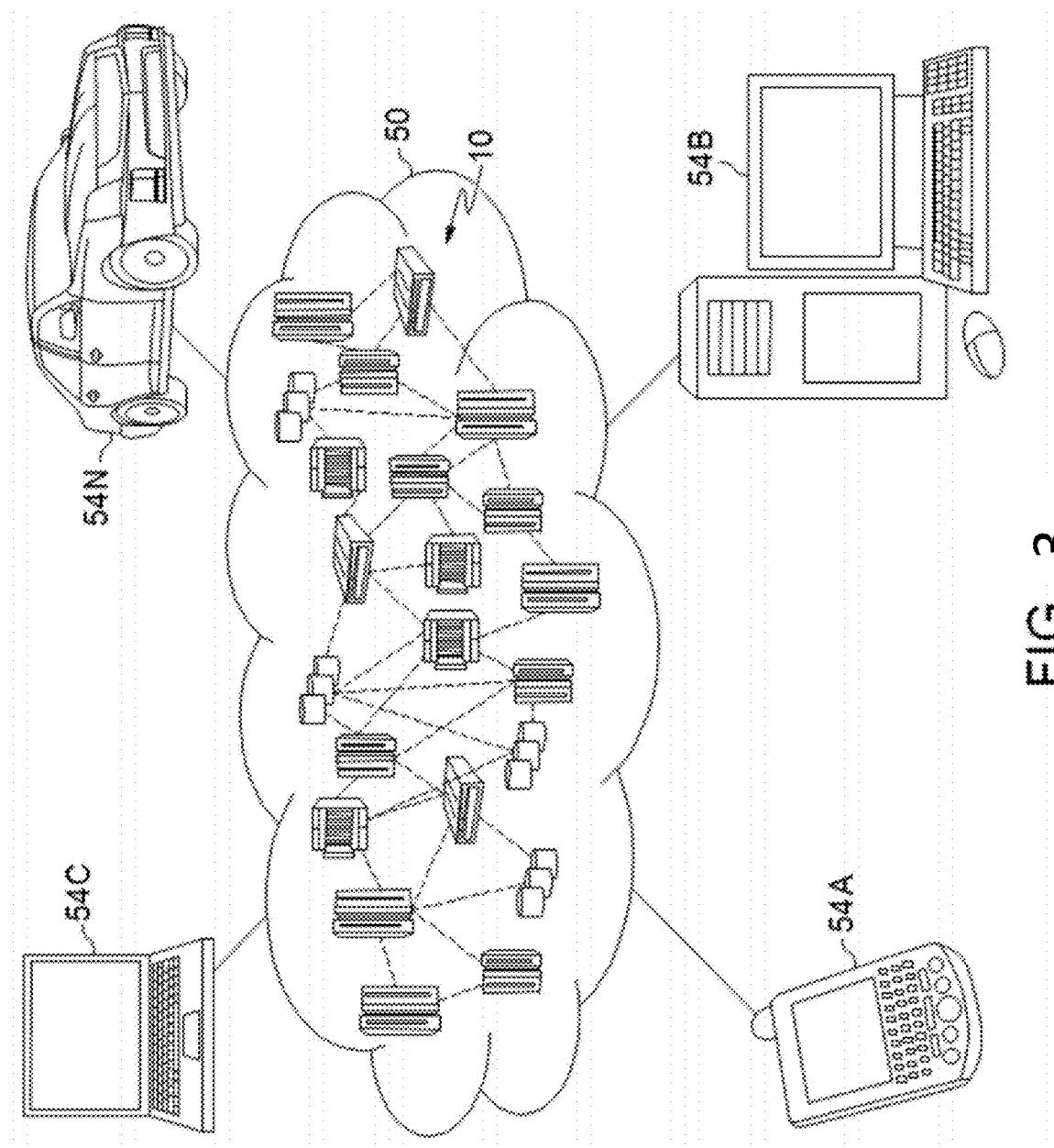
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g. using a web browser).

Figure 4:
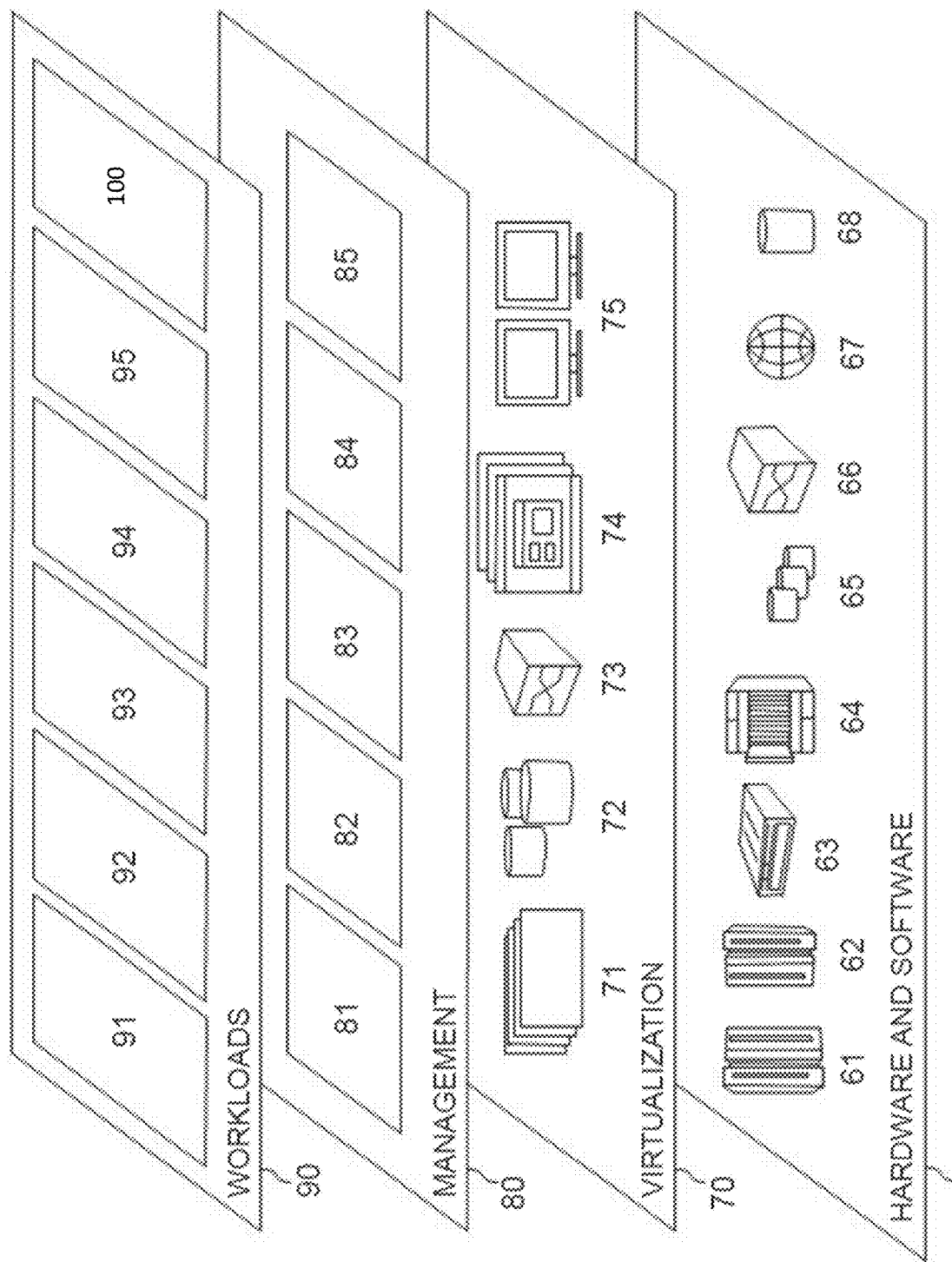
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and verification and authorization method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented verification and authorization method for verification of an identity of a trusted caller, the method comprising:
   receiving, by a receiving device, a verification sound from the trusted caller;
   verifying, via a computing device of the receiving device, the identity of the trusted caller via the verification sound that is received by the receiving device and that includes an asymmetrically encrypted payload sent by the trusted caller within the verification sound; and
   performing, via the computing device of the receiving device, an action that interacts with a second receiving device by using the verification sound based on a successful verification of the identity of the trusted caller, the action being encoded in instructions sent within the verification sound.

2. The method of claim 1, further comprising, prior to the performing, creating the action and encoding instructions to execute the action within the verification sound,
   wherein a data packet comprises:
      an audio layer including the verification sound; and
      a data layer including the instructions to perform the action.

3. The method of claim 2, wherein the audio layer includes a series of tones from a pentatonic scale.

4. The method of claim 2, wherein a start and an end of the verification sound are provided by the audio layer, and
   wherein the data layer encodes a string of bytes to encode a message based on the verification sound from the audio layer.

5. The method of claim 4, wherein the message comprises:
   an internal message including relevant information of the message in the string of bytes; and
   an external message that opens a uniform resource location (URL) from a command from the string of bytes.

6. The method of claim 4, wherein the message comprises a command encoded into the data layer.

7. The method of claim 1, wherein the verifying verifies the identity of the trusted caller by:

decrypting the asymmetrically encrypted payload, by the computing device, using an asynchronous key associated with the verification sound; and verifying the identity of the trusted caller if the asymmetrically encrypted payload of the verification sound decrypts correctly.

8. The method of claim 1, embodied in a cloud-computing environment.

9. The method of claim 1, Wherein the action is triggered in the second device based on the instructions within the verification sound.

10. A computer program product, the computer program product comprising a non-transitory computer-readable storage medium having program instructions embodied therewith, the program instructions executable by a computer to cause the computer to perform:

verifying, via a computing device of a receiving device that receives a verification sound, an identity of a trusted caller via the verification sound that is received by the receiving device and that includes an asymmetrically encrypted payload sent by the trusted caller within the verification sound; and performing, via the computing device of the receiving device, an action that interacts with a second receiving device by using the verification sound based on a successful verification of the identity of the trusted caller, the action being encoded in instructions sent within the verification sound.

11. The computer program product of claim 10, further comprising, prior to the performing, creating the action and encoding instructions to execute the action within the verification sound, wherein a data packet comprises:
an audio layer including the verification sound; and
a data layer including the instructions to perform the action.

12. The computer program product of claim 11, wherein the audio layer includes a series of tones from a pentatonic scale.

13. The computer program product of claim 11, wherein a start and an end of the verification sound are provided by the audio layer, and wherein the data layer encodes a string of bytes to encode a message based on the verification sound from the audio layer.

14. The computer program product of claim 13, wherein the message comprises:
an internal message including relevant information of the message in the string of bytes; and
an external message that opens a uniform resource location (URL) from a command from the string of bytes.

15. The computer program product of claim 13, wherein the message comprises a command encoded into the data layer.

16. The computer program product of claim 11, wherein the verifying verifies the identity of the trusted caller by:
decrypting the asymmetrically encrypted payload, by the computing device, using an asynchronous key associated with the verification sound; and
verifying the identity of the trusted caller if the asymmetrically encrypted payload of the verification sound decrypts correctly.

17. A verification and authorization system, the system comprising:
a processor; and
a memory, the memory storing instructions to cause the processor to perform:
verifying, via a computing device of a receiving device that receives a verification sound, an identity of a trusted caller via the verification sound that is received by the receiving device and that includes an asymmetrically encrypted payload sent by the trusted caller within the verification sound; and
performing, via the computing device of the receiving device, an action that interacts with a second receiving device by using the verification sound based on a successful verification of the identity of the trusted caller, the action being encoded in instructions sent within the verification sound.

18. The system of claim 17, further comprising, prior to the performing, creating the action and encoding instructions to execute the action within the verification sound,
wherein a data packet comprises:
an audio layer including the verification sound; and
a data layer including the instructions to perform the action,
wherein a start and an end of the verification sound are provided by the audio layer,
wherein the data layer encodes a string of bytes to encode a message based on the verification sound from the audio layer, and
wherein the message comprises:
an internal message including relevant information of the message in the string of bytes; and
an external message that opens a uniform resource location (URL) from a command from the string of bytes.

19. The system of claim 18, wherein the audio layer includes a series of tones from a pentatonic scale.

20. The system of claim 17, embodied in a cloud-computing environment.

* * * * *